United States Patent Office 3,444,232
Patented May 13, 1969

---

3,444,232
O-ALKYL OR PHENYLALKYL BENZO-HYDROXAMIC ACIDS
Jack Bernstein, New Brunswick, N.J., assignor to E. R. Squibb & Sons, Inc., New York, N.Y., a corporation of Delaware
No Drawing. Filed May 18, 1966, Ser. No. 550,948
Int. Cl. C07c *103/30, 161/00;* A61k *27/00*
U.S. Cl. 260—453                                          4 Claims

ABSTRACT OF THE DISCLOSURE

Compounds of the formula

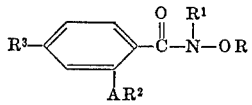

wherein R is hydrogen, lower alkyl or phenyl-lower alkyl, $R^1$ is hydrogen or lower alkyl, $R^2$ is lower alkyl or lower alkenyl, $R^3$ is nitro, amino, lower alkylamino or di-lower alkylamino and A is oxygen or sulfur, are useful in coccidiostat compositions.

---

This invention relates to benzohydroxamic acid derivatives and compositions containing them.

Coccidiosis is a disease affecting primarily poultry and is caused by protozia of the genus Eimeria, especially *E. tenella, E. necatrix* and *E. acervulina.* This disease causes severe and frequently fatal infection in poultry flocks. It constitutes a serious economic hazard.

Current practice in poultry raising is the feeding of coccidiostatic preparations in the general diet as a prophylactic measure. Known coccidiostats have failings in that they are not as highly effective as desirable, do not exert their effect against all species of infective organisms, are not free of undesirable side effects and/or are not economically feasible. It is an object of this invention to provide compounds and compositions which prevent the development and spread of coccidiosis effectively at low, economical levels and also for administration in treatment of the disease.

Although the compounds of this invention are preferred for use against coccidiosis, they also have antimicrobial activity, for example in combating *Staphylococcus aureus, Trichomonas vaginalis* or *Escherischia coli.*

The compounds of this invention have the formula (1)

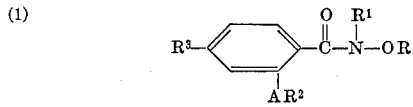

wherein R is hydrogen, lower alkyl or phenyl-lower alkyl, e.g., benzyl R' is hydrogen or lower alkyl, $R^2$ is lower alkyl or lower alkenyl, $R^3$ is nitro, amino, lower alkylamino or di-lower alkylamino and A is oxygen or sulfur.

The lower alkyl groups in all of the substituents referred to above are straight or branched chain hydrocarbon groups such as methyl, ethyl, propyl, isopropyl, butyl, s-butyl, t-butyl and the like. The lower alkenyl groups are of the same type including a double bond. In each instance, methyl is the preferred lower alkyl group. The preferred compounds of Formula I are those wherein R and $R^1$ each is hydrogen, A is oxygen or sulfur, $R^2$ is methyl or ethyl and $R^3$ is nitro.

Illustrative compounds include 2-methoxy-4-nitrobenzo-hydramic acid, 2-ethoxy - 4 - nitrobenzohydroxamic acid, 2-ethylmercapto-4-nitrobenzohydroxamic acid, 2-ethoxy-4-dimethylaminobenzohydroxamic acid, 2-ethoxy-4-aminobenzohydroxamic acid, O-methyl-2-ethoxy-4-nitrobenzohydroxamic acid, N-methyl-2-ethoxy-4-nitrobenzohydroxamic acid, N,O-dimethyl-2-ethoxy-4-nitro-benzohydroxamic acid, O-benzyl-2-ethoxy-4-nitrobenzohydroxamic acid, 2-allyloxy-4-nitrobenzohydroxamic acid and the like.

The compounds of Formula I may be synthesized by the reaction of an acyl halide of the formula (II)

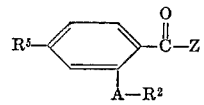

wherein Z is halide, preferably chlorine or bromine, $R^5$ is nitro or diloweralkylamino with an hydroxylamine of the formula (III)

wherein R and $R^1$ are as previously defined.

Those compounds wherein $R^3$ is amino are obtained by the reduction of the corresponding compound in which $R^3$ is nitro.

Alternatively, the compounds of Formula I may be synthesized by the reaction of a lower alkyl ester, preferably the methyl ester of an acid of the formula (IV)

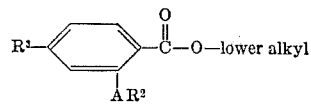

with an hydroxylamine.

The compounds of Formula I and especially 2-ethoxy-4-nitrobenzohydroxamic acid, are most effectively provided to the animal in its food or drink. Thus it may be placed in solution or in suspension in its drinking water or preferably admixed in the feed composition.

The compositions of this invention may be produced by intimately dispersing the active coccidiostatic ingredient throughout a carrier or diluent which is either solid or liquid. Preferably, the compound is thoroughly admixed with a major proportion of poultry feed supplied to the fowl, e.g., chick starter, broiler and grower feeds, laying mashes, breeder and turkey breeder mashes, turkey starter and grower feeds and the like.

The active material may also be incorporated in premixes wherein higher proportions of the active ingredients are present. The concentrated premix is then diluted with additional feed by the feed supplier or poultry grower, for example, one pound of premix per ton of feed, to obtain a feed containing the requisite amount of coccidiostat.

It will also be appreciated that the active ingredients may be supplied in combination with an inert carrier or diluent such as attapulgus clay, bentonite or edible vegetable materials. Liquid dispersons in water can be prepared by using emulsifiers and/or surface active agents.

The amount of compound of Formula I incorporated in the food or water is in the range of about 0.005 to 0.5% (by weight), preferably about 0.02 to 0.04%. In addition, the incorporation of a tetraalykylthiuram disulfide, e.g., tetramethylthiuram disulfide, tetraethylthiuram disulfide and the like, frequently enhance the action of a compound of Formula I and thus conserve the amount of the latter required. Thus, a total of about 0.005 to 0.1% (by weight) preferably about 0.01 to 0.03% of the combined substances in the feed is usually adequate. Approximately equal proportions (percent by weight) of the two components is sufficient, but a ratio of about 1 to 3 of the hydroxamic acid to about 1 to 3 parts of the disulfide may be used. The preferred combination contains 2-methylmercapto-4-nitrobenzohydroxamic acid and tetraethylthiuram disulfide.

The following examples are illustrative of the invention. All temperatures are on the centigrade scale.

EXAMPLE 1

2-ethoxy-4-nitrobenzohydroxamic acid (a) 2-ethoxy-4-nitrobenzoyl chloride.—A mixture of 10 grams of 2-ethoxy-4-nitrobenzoic acid and 20 ml. of thionyl chloride is refluxed for three hours and then concentrated under reduced pressure to remove the excess thionyl chloride. Twenty milliliters of anhydrous hexane is then added to the residue and the solvent removed by distillation to remove the last traces of the thionyl chloride. The residue of 2-ethoxy-4-nitrobenzyl chloride is used without further purification.

(b) 2-ethoxy-4 - nitrobenzohydroxamic acid.—Twenty-three grams of 2-ethoxy-4-nitrobenzoyl chloride, 7 grams of hydroxylamine hydrochloride and 12 grams of anhydrous sodium carbonate are suspended in 300 ml. of diethyl ether and the mixture stirred vigorously. There is then added dropwise about 20 ml. of water and the stirring continued for an additional three hours. The reaction mixture is then concentrated to remove the solvent, and the residue extracted with hot methanol. The methanol is concentrated and then allowed to cool. The desired 2-ethoxy-4-nitrobenzohydroxamic acid crystallizes from the methanol and is recovered by filtration.

By substituting for the hydroxylamine hydrochloride, an equivalent amount of O-methylhydroxylamine hydrochloride, O-benzylhydroxylamine, N-methylhydroxylamine hydrochloride or N,O-dimethylhydroxylamine hydrochloride in the above procedure, there is obtained, respectively, O-methyl-2-ethoxy-4-nitrobenzohydroxamic acid, O - benzyl-2 - ethoxy - 4 - nitrobenzohydroxamic acid, N - methyl-2-ethoxy-4 - nitrobenzohydroxamic acid or N,O - dimethyl-2-ethoxy-4-nitrobenzohydroxamic acid.

EXAMPLE 2

2-ethoxy-4-aminobenzohydroxamic acid

To a solution of 5 grams of 2-ethoxy-4-nitrobenzohydroxamic acid in absolute ethanol, there is added one gram of a 5% palladium on carbon catalyst and the mixture is treated with hydrogen at 50 p.s.i. until the theoretical amount of hydrogen has reacted. The mixture is then filtered and concentrated to yield the desired 2-ethoxy-4-aminobenzohydroxamic acid.

EXAMPLE 3

2-ethylmercapto-4-nitrobenzohydroxamic acid

Following the procedure of Example 1, but substituting an equivalent amount of 2-ethylmercapto-4-nitrobenzoic acid for the 2-ethoxy-4-nitrobenzoic acid, there is obtained the desired 2-ethylmercapto-4-nitrobenzohydroxamic acid.

EXAMPLE 4

2-methoxy-4-butylaminobenzohydroxamic acid

To a solution of 56.3 grams of potassium hydroxide in 140 ml. of methanol there is added a solution of 46.7 grams of hydroxylamine hydrochloride in 240 ml. of methanol at 30–40°. The mixture is cooled to 5° for ten minutes and there is then added 70 grams of methyl 2-methoxy-4-butylaminobenzoate and the mixture filtered immediately. The filtrate is allowed to stand three days at room temperature in an atmosphere of nitrogen. The reaction mixture is then concentrated at 30° under reduced pressure. The residue is dissolved in a small amount of water, filtered and carefully neutralized. The precipitated 2-methoxy-4-butylaminobenzohydroxamic acid is purified by crystallization from aqueous methanol.

EXAMPLE 5

2-allyloxy-4-diethylaminobenzohydroxamic acid (a) Methyl 2-allyloxy-4-diethylaminobenzoate.—To a solution of 2.3 grams of sodium dissolved in 300 ml. of methanol there is added 22 grams of methyl-4-diethylaminosalicylate. To this mixture there is then added with vigorous stirring a solution of 12 grams of allyl bromide in 50 ml. of methanol. The reaction mixture is stirred vigorously and then warmed gently to complete the reaction. The methanol is removed by distillation and the residue treated with 200 ml. of ether. The sodium bromide is filtered off and the filtrate concentrated to yield the desired methyl 2-allyloxy-4-diethylaminobenzoate.

(b) 2-allyloxy-4-diethylaminobenzohydroxamic acid.—Following the procedure of Example 4, but substituting the methyl 2-allyloxy-4-diethylaminobenzoate for an equivalent amount of methyl 2-methoxy-4-butylaminobenzoate, there is obtained the desired 2-allyloxy-4-diethylaminobenzohydroxamic acid.

EXAMPLE 6

A conventional basal ration having the following ingredients is prepared: meat and bone scrap, fish meal, vitamin $B_{12}$, poultry-by-product meal, dehulled soybean oil meal, dehydrated alfalfa meal, corn gluten meal, pulverized oats, ground barley, corn meal, wheat middlings, dried grain and whey fermentation solubles, methionine hydroxy analogue calcium, riboflavin, calcium pantothenate, choline chloride, niacin, animal fat, menadione sodium bisulfite, vitamin E supplement, butylated hydroxytoluene, vitamin A palmitate, D-activated animal sterol, calcium carbonate, defluorinated phosphate, salt, calcium iodate, manganese oxide, zinc oxide, cobalt hydroxide, cobalt carbonate.

A feed composition is prepared by adding 2-ethoxy-4-nitrobenzohydroxamic acid to the basal ration in an amount constituting 0.03% by weight of the final mixture. The ingredients are thoroughly admixed to provide the ration which is fed to young chicks about 3 weeks old.

EXAMPLE 7

A chick feed is prepared as in Example 6 but substituting 0.04% by weight of 2-ethylmercapto-4-nitrobenzohydroxamic acid.

EXAMPLE 8

A basal ration is prepared as in Example 6. To the basal ration are added 0.01% by weight of 2-ethoxy-4-nitrobenzohydroxamic acid and 0.01% by weight of tetramethylthiuram disulfide. The ingredients are thoroughly admixed and utilized in the same manner as in Example 6.

Compositions utilizing other compounds of Formula I above may similarly be prepared.

What is claimed is:
1. A compound of the formula

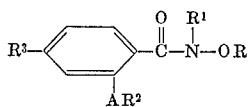

wherein R is lower alkyl or phenyl-lower alkyl, $R^1$ is hydrogen or lower alkyl, $R^2$ is lower alkyl or lower alkenyl, $R^3$ is nitro, amino, lower alkylamino or di-lower alkylamino and A is oxygen or sulfur.

2. A compound as in claim 1 wherein R, $R^1$ and $R^2$ are each lower alkyl, $R^3$ is nitro and A is oxygen.
3. A compound as in claim 1 wherein $AR^2$ is ethoxy.
4. The compound of the formula

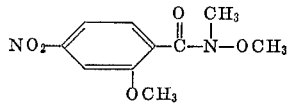

References Cited

UNITED STATES PATENTS

| | | | |
|---|---|---|---|
| 3,052,602 | 9/1962 | Hymas et al. | 167—53.1 |
| 3,187,042 | 6/1965 | Richter. | |
| 3,236,871 | 2/1966 | Hinman et al. | 260—453 |
| 3,352,899 | 11/1967 | Taniguchi et al. | 260—453 |
| 3,364,110 | 1/1968 | Lehr et al. | 167—53.1 |

FOREIGN PATENTS

| | | |
|---|---|---|
| 744,307 | 2/1956 | Great Britain. |
| 5,178 | 6/1962 | Japan. |

OTHER REFERENCES

Chemical Abst., vol. 64, column 1073e (1965) McManus et al.

CHARLES B. PARKER, *Primary Examiner.*

S. T. LAWRENCE, *Assistant Examiner.*

U.S. Cl. X.R.

99—4; 260—470, 471, 500.5, 544; 424—298, 315